United States Patent
Zweig

(10) Patent No.: US 12,073,344 B2
(45) Date of Patent: Aug. 27, 2024

(54) SYSTEMS AND METHODS FOR PROVIDING A UNIVERSAL OCCUPATIONAL TAXONOMY

(71) Applicant: Revelio Labs, Inc., New York, NY (US)

(72) Inventor: Ben Zweig, New York, NY (US)

(73) Assignee: REVELIO LABS, INC., New York, NY (US)

( * ) Notice: Subject to any disclaimer, the term of this patent is extended or adjusted under 35 U.S.C. 154(b) by 238 days.

(21) Appl. No.: 17/139,674

(22) Filed: Dec. 31, 2020

(65) Prior Publication Data

US 2021/0365873 A1    Nov. 25, 2021

Related U.S. Application Data

(60) Provisional application No. 62/955,877, filed on Dec. 31, 2019.

(51) Int. Cl.
| | |
|---|---|
| *G06Q 10/0631* | (2023.01) |
| *G06F 18/21* | (2023.01) |
| *G06F 18/211* | (2023.01) |
| *G06F 18/231* | (2023.01) |
| *G06F 18/2413* | (2023.01) |
| *G06N 3/08* | (2023.01) |

(52) U.S. Cl.
CPC .... *G06Q 10/063118* (2013.01); *G06F 18/211* (2023.01); *G06F 18/217* (2023.01); *G06F 18/231* (2023.01); *G06F 18/24137* (2023.01); *G06N 3/08* (2013.01)

(58) Field of Classification Search
None
See application file for complete search history.

(56) References Cited

U.S. PATENT DOCUMENTS

| | | | | |
|---|---|---|---|---|
| 2006/0242190 | A1* | 10/2006 | Wnek | G06F 16/367 |
| | | | | 707/999.102 |
| 2018/0144253 | A1* | 5/2018 | Merhav | G06F 16/2228 |
| 2018/0293485 | A1* | 10/2018 | Merhav | G06N 3/04 |

OTHER PUBLICATIONS

Wang et al, "DeepCarotene—Job Title Classification with Multi-stream Convolutional Neural Network," 2019 IEEE International Conference on Big Data (Big Data), 2019, pp. 1953-1961 (Year: 2019).*

Aljabout et al., Clustering with Deep Learning: Taxonomy and New Methods, arXiv:1801.07648v2, Sep. 13, 2018 (Year: 2018).*

* cited by examiner

*Primary Examiner* — Chesiree A Walton
(74) *Attorney, Agent, or Firm* — Pillsbury Winthrop Shaw Pittman LLP

(57) ABSTRACT

Systems and methods for providing a universal occupational taxonomy establish one or more levels of granularity of a plurality of jobs; assemble data for each job of the plurality of jobs; train one or more vector representations, in which a vector representation is trained for each job of the plurality of jobs; reevaluate the one or more levels of granularity based on the training; cluster the plurality of jobs into one or more clusters based on the one or more vector representations; name the one or more resulting clusters a representative title; classify the one or more jobs to the one or more clusters; and output an occupational taxonomy.

12 Claims, 3 Drawing Sheets

SYSTEMS AND METHODS FOR PROVIDING A UNIVERSAL OCCUPATIONAL TAXONOMY

CROSS-REFERENCE TO RELATED APPLICATION

This application claims priority to U.S. Provisional Application No. 62/955,877, filed Dec. 31, 2019.

FIELD OF THE INVENTION

The present invention is in the field of taxonomies. In particular, the present invention is directed systems and methods for providing a universal occupational taxonomy.

BACKGROUND

Every company uses a distinct taxonomy of job titles which refer to different occupations and seniority levels. These occupational taxonomies are therefore not consistent across companies. It is desirable to compare the occupational composition of companies, which requires consistency of occupational classifications between companies. This requires a universal occupational taxonomy that can classify every job title in every company, in a way that ensures that like jobs are grouped with like jobs and that different jobs are classified into different groups.

Presently available prior art systems and methods do not generate an occupational taxonomy in an entirely unsupervised way and provide inaccurate taxonomies. For example, government occupation taxonomies such as O*Net (https://www.onetonline.org/) are generated through a large panel of experts, which is costly, prone to human bias, does not adjust to changes in the occupational landscape, and is not set up in a way where it is easy for others to map to it. To illustrate the severity of this issue, in O*Net, for example, which is the most widely used standard occupation taxonomy, the occupation "Data Scientist" did not exist until this year, and meanwhile there are twenty-one different types of occupations in the category of "Farming, Fishing, and Forestry". What is needed is a universal and flexible taxonomy, designed so that any company can easily use it, which can lead to enormous advances in the way workforces across companies can be compared.

BRIEF DESCRIPTION OF THE INVENTION

According to embodiments of the invention, there are provided systems and methods for providing a universal occupational taxonomy. Embodiments of the invention are performed on a computer having a memory, a processor and one or more code sets stored in the memory and executing in the processor. Embodiments of the invention are configured to establish one or more levels of granularity of a plurality of jobs; assemble data for each job of the plurality of jobs; train one or more vector representations, wherein a vector representation is trained for each job of the plurality of jobs; reevaluate the one or more levels of granularity based on the training; cluster the plurality of jobs into one or more clusters based on the one or more vector representations; name the one or more resulting clusters a representative title; classify the one or more jobs to the one or more clusters; and output an occupational taxonomy.

Some embodiments of the invention establish a most granular level and setting a first threshold for counts for company-title pairs; if the first threshold is not met, establish a higher level and setting a second threshold for industry-title pairs; and if the second threshold is not met, establish one or more additional higher levels and corresponding thresholds until a threshold is met. In, some embodiments of the invention, when assembling the data for each job, the processor is further configured to collect text of descriptions of the plurality of jobs from a plurality of profiles; and concatenate all the collected profile data into one text document for each job.

In some embodiments of the invention, training the one or more vector representations is based on the text document for each job. In some embodiments of the invention, when training the one or more vector representations for each job, the processor is further configured to: implement a neural network based on at least one of a distributed bag of words (DBOW) implementation, a skip-gram implementation, a Distributed Memory (DM) model, a Bidirectional Encoder Representations from Transformers (BERT) model and a Universal Language Model Fine-tuning (ULMFiT) model.

In some embodiments of the invention, when reevaluating the one or more levels of granularity based on the training, the processor is further configured to: combine a first given vector representation and a second given vector representation into a single vector representation when a statistical insignificance is identified between the first given vector representation and the second given vector representation.

In some embodiments of the invention, when naming the one or more resulting clusters, the representative title, the processor is further configured to: select, for each cluster, a title based on a distance from centroid (X), a size (Y), and a binary variable which indicates whether this title exists without an industry (Z).

In some embodiments of the invention, when clustering the plurality of jobs into one or more clusters based on the one or more vector representations, the processor is further configured to: implement one or more agglomerative models; and create a hierarchical taxonomy, wherein one or more granular categories are each mapped to one broader category in a many-to-one mapping. In some embodiments of the invention, when outputting the occupational taxonomy, the processor is further configured to: output the occupational taxonomy at least one of to a display and as a data set.

Further embodiments of the invention provide systems and methods for providing a universal occupational taxonomy. Embodiments include establishing one or more levels of granularity of a plurality of jobs; assembling data for each job of the plurality of jobs; training one or more vector representations, wherein a vector representation is trained for each job of the plurality of jobs; reevaluating the one or more levels of granularity based on the training; clustering the plurality of jobs into one or more clusters based on the one or more vector representations; classifying the one or more jobs to the one or more clusters; and outputting an occupational taxonomy at least one of to a display and as a data set. Some embodiments may further include naming the one or more resulting clusters a representative title.

These and other aspects, features, and advantages will be understood with reference to the following description of certain embodiments of the invention.

BRIEF DESCRIPTION OF THE DRAWINGS

The subject matter regarded as the invention is particularly pointed out and distinctly claimed in the concluding portion of the specification. Embodiments of the invention, however, both as to organization and method of operation, together with objects, features and advantages thereof, may best be understood by reference to the following detailed description when read with the accompanied drawings. Embodiments of the invention are illustrated by way of example and not limitation in the figures of the accompanying drawings, in which like reference numerals indicate corresponding, analogous or similar elements, and in which:

Figure 1:
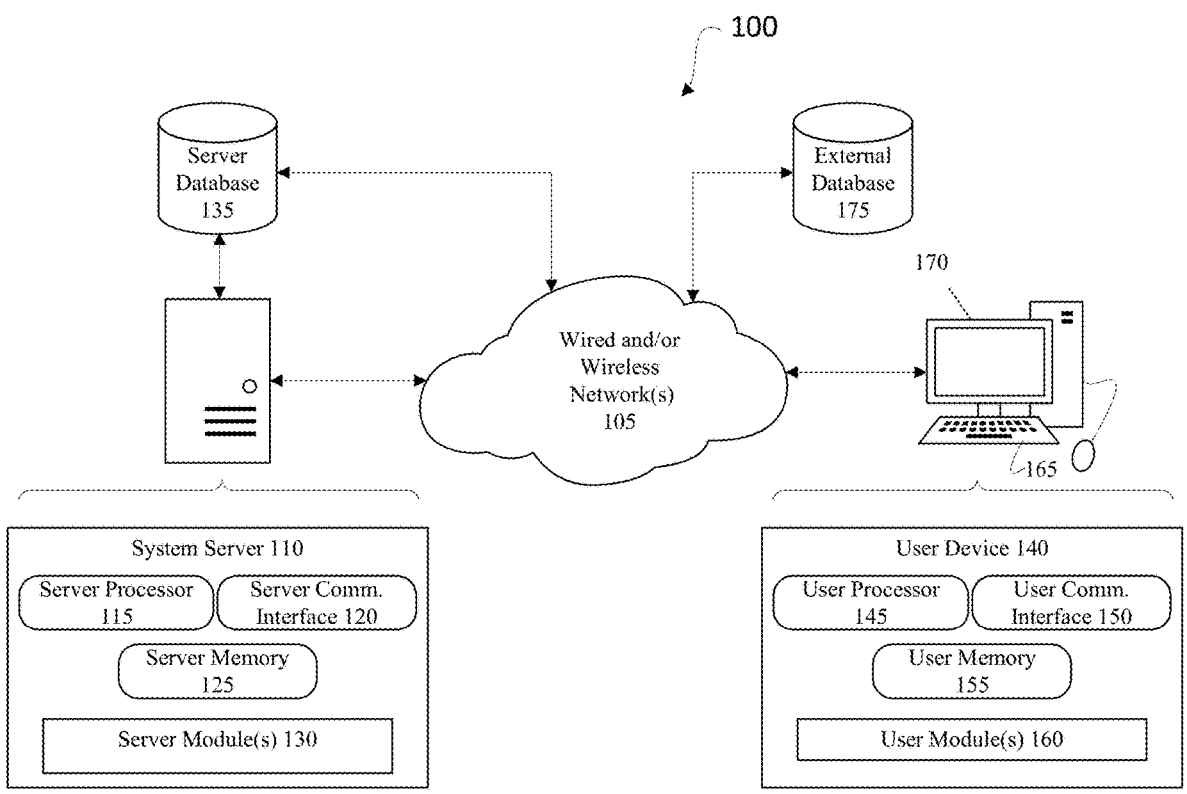
FIG. 1 shows a high-level diagram illustrating an example configuration of a system for performing one or more aspects of the invention described herein, according to at least one embodiment of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the detailed description herein, numerous specific details are set forth in order to provide a thorough understanding of the invention. However, it will be understood by those skilled in the art that the present invention may be practiced without these specific details. In other instances, well-known methods, procedures, and components, modules, units and/or circuits have not been described in detail so as not to obscure the invention. Some features or elements described with respect to one embodiment may be combined with features or elements described with respect to other embodiments. For the sake of clarity, discussion of same or similar features or elements may not be repeated.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that may store instructions to perform operations and/or processes. Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. Unless explicitly stated, the method embodiments described herein are not constrained to a particular order or sequence. Additionally, some of the described method embodiments or elements thereof can occur or be performed simultaneously, at the same point in time, or concurrently.

Embodiments of the invention provide systems and methods that can meaningfully analyze the workforce of each company in a standardized way. Embodiments of the invention use the text of many (e.g., hundreds of millions) resumes and online professional profiles. From the profile data, the system may typically use the experience section which contains company name (which we can map to industry), job title, and the description of the position (often bullet points which outline the tasks, activities, outcomes, and tools).

Embodiments of the invention train a numerical vector representation for each job and then cluster jobs together. The steps in this process in some embodiments are: (1) Establish level of granularity of jobs; (2) Assemble data for each job; (3) Train vector representation; (4) Revisit granularity; (5) Cluster jobs; (6) Name Clusters; (7) Classify jobs to cluster; and (8) output an occupational taxonomy.

FIG. 1 shows a high-level diagram illustrating an example configuration of a system 100 for performing one or more aspects of the invention described herein, according to at least one embodiment of the invention. System 100 includes network 105, which may include the Internet, one or more telephony networks, one or more network segments including local area networks (LAN) and wide area networks (WAN), one or more wireless networks, or a combination thereof. System 100 also includes a system server 110 constructed in accordance with one or more embodiments of the invention. In some embodiments, system server 110 may be a stand-alone computer system. In other embodiments, system server 110 may include a network of operatively connected computing devices, which communicate over network 105. Therefore, system server 110 may include multiple other processing machines such as computers, and more specifically, stationary devices, mobile devices, terminals, and/or computer servers (collectively, "computing devices"). Communication with these computing devices may be, for example, direct or indirect through further machines that are accessible to the network 105.

System server 110 may be any suitable computing device and/or data processing apparatus capable of communicating with computing devices, other remote devices or computing networks, receiving, transmitting and storing electronic information and processing requests as further described herein. System server 110 is therefore intended to represent various forms of digital computers, such as laptops, desktops, workstations, personal digital assistants, servers, blade servers, mainframes, and other appropriate computers and/or networked or cloud based computing systems capable of employing the systems and methods described herein.

System server 110 may include a server processor 115 which is operatively connected to various hardware and software components that serve to enable operation of the system 100. Server processor 115 serves to execute instructions to perform various operations relating to advanced search, and other functions of embodiments of the invention as described in greater detail herein. Server processor 115 may be one or a number of processors, a central processing unit (CPU), a graphics processing unit (GPU), a multi-processor core, or any other type of processor, depending on the particular implementation.

System server 110 may be configured to communicate via communication interface 120 with various other devices connected to network 105. For example, communication interface 120 may include but is not limited to, a modem, a Network Interface Card (NIC), an integrated network interface, a radio frequency transmitter/receiver (e.g., Bluetooth wireless connection, cellular, Near-Field Communication (NFC) protocol, a satellite communication transmitter/receiver, an infrared port, a USB connection, and/or any other such interfaces for connecting the system server 110 to other computing devices and/or communication networks such as private networks and the Internet.

In certain implementations, a server memory 125 is accessible by server processor 115, thereby enabling server processor 115 to receive and execute instructions such a code, stored in the memory and/or storage in the form of one or more software modules 130, each module representing one or more code sets. The software modules 130 may include one or more software programs or applications (collectively referred to as the "server application") having computer program code or a set of instructions executed partially or entirely in server processor 115 for carrying out operations for aspects of the systems and methods disclosed herein, and may be written in any combination of one or more programming languages. Server processor 115 may be configured to carry out embodiments of the present invention by, for example, executing code or software, and may execute the functionality of the modules as described herein.

In various embodiments of the system of FIG. 1, the exemplary software modules may include a communication module, and other modules as described here. The communication module may be executed by server processor 115 to facilitate communication between system server 110 and the various software and hardware components of system 100, such as, for example, server database 135, client device 140, and/or external database 175 as described herein.

Of course, in some embodiments, server modules 130 may include more or less actual modules which may be executed to enable these and other functionalities of the invention. The modules described herein are therefore intended to be representative of the various functionalities of system server 110 in accordance with some embodiments of the invention. It should be noted that in accordance with various embodiments of the invention, server modules 130 may be executed entirely on system server 110 as a stand-alone software package, partly on system server 110 and partly on user device 140, or entirely on user device 140.

Server memory 125 may be, for example, a random access memory (RAM) or any other suitable volatile or non-volatile computer readable storage medium. Server memory 125 may also include storage which may take various forms, depending on the particular implementation. For example, the storage may contain one or more components or devices such as a hard drive, a flash memory, a rewritable optical disk, a rewritable magnetic tape, or some combination of the above. In addition, the memory and/or storage may be fixed or removable. In addition, memory and/or storage may be local to the system server 110 or located remotely.

In accordance with further embodiments of the invention, system server 110 may be connected to one or more database(s) 135, for example, directly or remotely via network 105. Database 135 may include any of the memory configurations as described herein, and may be in direct or indirect communication with system server 110. In some embodiments, database 135 may store information relating to user documents. In some embodiments, database 135 may store information related to one or more aspects of the invention.

As described herein, among the computing devices on or connected to the network 105 may be one or more user devices 140. User device 10 may be any standard computing device. As understood herein, in accordance with one or more embodiments, a computing device may be a stationary computing device, such as a desktop or laptop computer, tablet, smart device, kiosk and/or other machine, each of which generally has one or more processors, such as user processor 145, configured to execute code to implement a variety of functions, a computer-readable memory, such as user memory 155, a user communication interface 150, for connecting to the network 105, one or more user modules, such as user module 160, one or more input devices, such as input devices 165, and one or more output devices, such as output devices 170. Typical input devices, such as, for example, input devices 165, may include a keyboard, pointing device (e.g., mouse or digitized stylus), a web-camera, and/or a touch-sensitive display, etc. Typical output devices, such as, for example output device 170 may include one or more of a monitor, display, speaker, printer, etc.

In some embodiments, user module 160 may be executed by user processor 145 to provide the various functionalities of user device 140. In particular, in some embodiments, user module 160 may provide a user interface with which a user of user device 140 may interact, to, among other things, communicate with system server 110

Additionally or alternatively, a computing device may be a mobile electronic device ("MED"), which is generally understood in the art as having hardware components as in the stationary device described above, and being capable of embodying the systems and/or methods described herein, but which may further include componentry such as wireless communications circuitry, gyroscopes, inertia detection circuits, geolocation circuitry, touch sensitivity, among other sensors. Non-limiting examples of typical MEDs are smartphones, personal digital assistants, tablet computers, and the like, which may communicate over cellular and/or Wi-Fi networks or using a Bluetooth or other communication protocol. Typical input devices associated with conventional MEDs include, keyboards, microphones, accelerometers, touch screens, light meters, digital cameras, and the input jacks that enable attachment of further devices, etc.

In some embodiments, user device 140 may be a "dummy" terminal, by which processing and computing may be performed on system server 110, and information may then be provided to user device 140 via server communication interface 120 for display and/or basic data manipulation. In some embodiments, modules depicted as existing on and/or executing on one device may additionally or alternatively exist on and/or execute on another device. For example, in some embodiments, one or more modules of server module 130, which is depicted in FIG. 1 as existing and executing on system server 110, may additionally or alternatively exist and/or execute on user device 140. Likewise, in some embodiments, one or more modules of user module 160, which is depicted in FIG. 1 as existing and executing on user device 140, may additionally or alternatively exist and/or execute on system server 110.

Embodiments of the invention use the text of many (e.g., hundreds of millions) resumes and online professional profiles in order to generate, create, or otherwise provide a universal occupational taxonomy. From the profile data, the system may typically use the experience section which contains company name (e.g., which can be mapped to a particular industry), job title, and the description of the position (often bullet points which outline the tasks, activities, outcomes, and tools).

Figure 2:
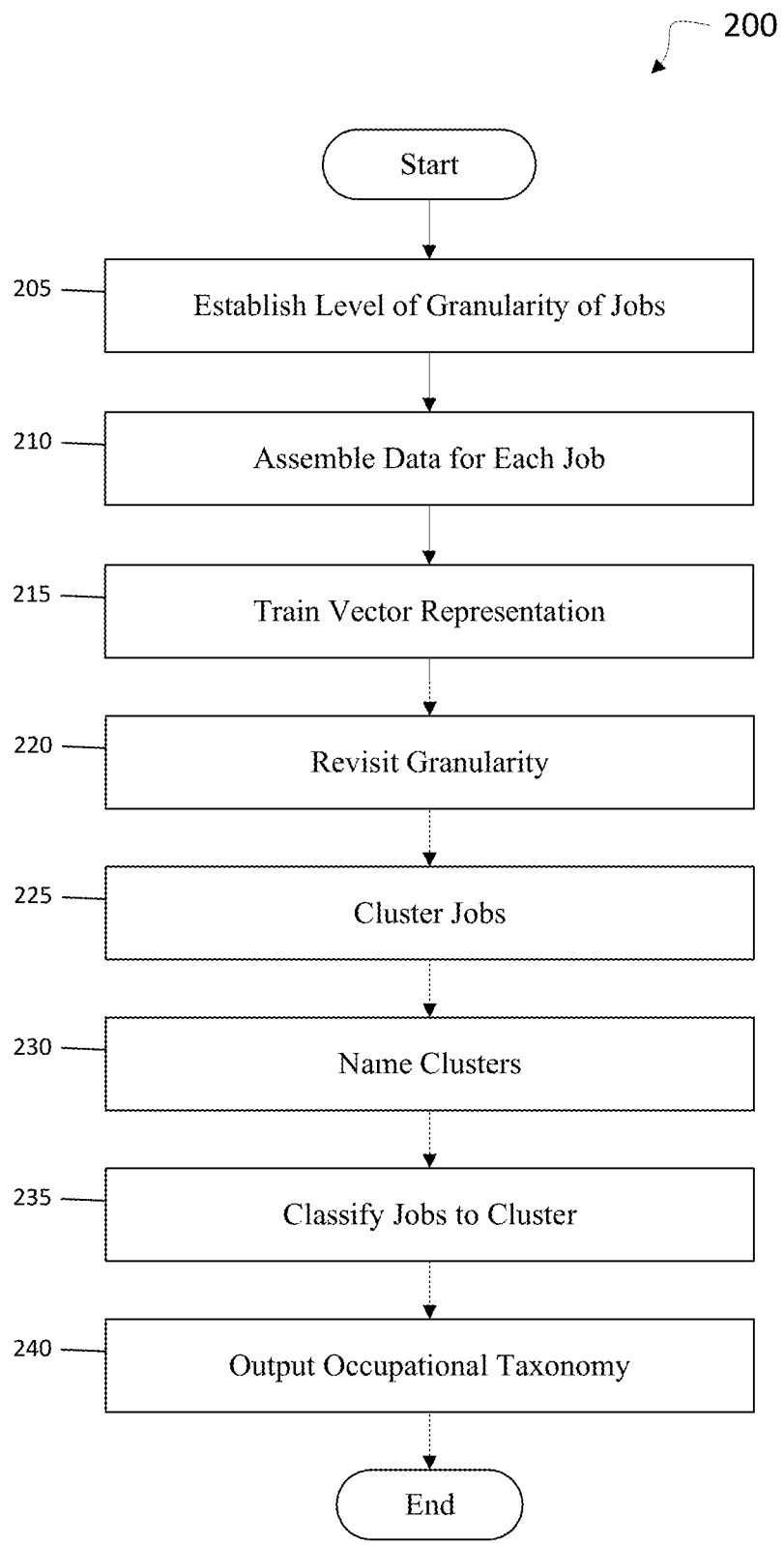
FIG. 2 is a high-level diagram illustrating an example configuration of a method workflow for providing a universal occupational taxonomy according to at least one embodiment of the invention.

FIG. 2 is a high-level diagram illustrating an example configuration of a method workflow for providing a universal occupational taxonomy according to at least one embodiment of the invention. Embodiments of the invention train a numerical vector representation for each job and then cluster jobs together to create the taxonomy.

In some embodiments, method workflow 200 may be performed on a computer (e.g., system server 110) having a processor (e.g., server processor 115), memory (e.g., server memory 125), and one or more code sets or software (e.g., server module(s) 130) stored in the memory and executing in or executed by the processor. Method workflow 200 begins at step 205, when the processor is configured to establish one or more levels of granularity of jobs.

Embodiments of the invention may be robust to identical titles referring to different occupations in different companies or different industries. For example, the title Associate should take on a different meaning in investment banks and law firms—the job is fundamentally different despite the title being the same. Similarly, Product Manager may mean different things at Google and Microsoft. In contract, Accountant may refer to the same occupation regardless of whether it is at Verizon or Boeing.

Accordingly, embodiments of the invention may set up one or more levels that are flexible to different idiosyncrasies of meaning. For example, the most granular level may be at the company-title level and the broadest level may be at the title level. Embodiments of the invention may balance flexibility with the training of robust algorithms that are less sensitive to small subsamples. The processor may, for example, start with the most granular level, then set a threshold for counts for company-title pairs. If that threshold is not met, in some embodiments the processor may go up to the industry-title level, for example. If that level is not met, in some embodiments, the processor may go up to the title level which is most broad. That way, each job has enough data to train a reliable representation. For example, a Software Engineer at Facebook may be considered a unique job but a Software Engineer at a relatively small company such as, for example, Revelio Labs, Inc., will use the industry instead of the company. After training vector representations for each job (i.e., one vector representation per job), embodiments of the systems and methods described herein may revisit the question of granularity to make additional improvements to the robustness of the algorithm.

Next, at step 210, in some embodiments, the processor may assemble data for each job, e.g., from available profiles, online resumes, databases, etc. For each job, the processor may collect the text of the descriptions from the profile data. For example, the following are the descriptions from two profiles with the same title (of different individuals in different companies):

Profile A: At Kno.e.sis, I am associated with Semantic Web group where I've contributed to multiple projects group and individual projects involving Text Mining, Natural Language Processing and Machine Learning. I have exploited knowledge encoded in knowledge graphs to identify and link Implicit Entity Mentions in unstructured text specifically Tweets and Electronic Medical Records. I have also had the opportunity to work big data analytics platforms which involves many big data technologies like Apache Storm, Hadoop and MongoDB.

Profile B: Implementing an automatic Information Extraction pipeline by processing media reports, with natural language processing (NLP) algorithms focusing on Named Entity Recognition (NER) for the Security Force Monitor project.

In some embodiments, the processor may concatenate all data from the profile data into one large document for each job. For example, for the job Microsoft-Engineer, the processor may collect all the text descriptions from thousands of positions and include them into one document. In some embodiments, the processor may also detect non-English profiles and exclude them. In some embodiments, the processor may also exclude special characters and convert all text to lowercase.

At step 215, in some embodiments, the processor may train one or more vector representations. In some embodiments, the processor may train a vector representation for each job based on the document of text using a neural network, e.g., a single-layer neural network, based on, for example, a distributed bag of words (DBOW) implementation, e.g., influenced by the Paragraph Vector initially proposed by Le & Mikolov (2015) (https://cs.stanford.edu/~quocle/paragraph_vector.pdf, incorporated herein by reference). The doc2vec model proposed by Le & Mikolov was initially intended for generating vector representations for documents of different sizes but works well for corpuses of descriptions of jobs across many different documents (e.g., resumes, online professional profiles, etc.). In some embodiments, this model may form the basis of a good starting point. In other embodiments, other constructs, such as Skip-gram, Distributed Memory (DM), Bidirectional Encoder Representations from Transformers (BERT) (https://arxiv.org/pdf/1810.04805.pdf), Universal Language Model Fine-tuning (ULMFiT) (https://arxiv.org/pdf/1801.06146.pdf), or variations thereof, etc., may also or alternatively be implemented. In some embodiments, the processor may find that the size of each vector should be smaller than the recommended sizes proposed in standard implementations. This may be due to the fact that the dimensionality of job space is more limited than the general case. For very uncommon job titles, a small vector size may be critical—because vectors are randomly initialized, a corpus that is too small may not give enough flexibility for vectors to converge on a meaningful vector. In some embodiments, the processor may use one or more transfer learning models to initialize a first layer in a multi-layer neural network, e.g., based on the vectors that have already been trained.

At step 220, in some embodiments, the processor may be configured to revisit and/or reevaluate the granularity (e.g., as described in step 205). In some embodiments, the processor may begin with a null hypothesis that all titles are the same across industries and companies. In some embodiments, the processor may test these differences using standard hypothesis testing techniques, using, for example, Hotelling's T2 test (Hotelling, Harold. The Generalization of Student's Ratio. Ann. Math. Statist. 2 (1931), no. 3, 360-378. doi:10.1214/aoms/1177732979; https://projecteuclid.org/euclid.aoms/1177732979). In some embodiments, when the processor reaches a confidence threshold that allows it to reject the null hypothesis, then the processor may continue to treat vectors with the same titles but different industries or companies as distinct. When the processor fails to reject the null hypothesis, in some embodiments, it may be configured to take weighted averages of the vectors of each sub-title and aggregate those to a higher level (e.g., where the weights are simply counts of occurrence).

For example, if the processor finds that the mean vector for Accountant in Financial Services is statistically insignificant from the mean vector for Accountant in Telecommunications, it may be configured to combine them into one vector. These weighted average vectors are asymptotically equivalent to retraining a new vector for the combined jobs. In some embodiments, the processor may take weighted averages for reasons more related to computational efficiency rather than informational efficiency. That is to say that if the processor had retrained a new vector for the combination of Accountant in Financial Services and Accountant in Telecommunications, retraining the new vector would take a much longer time than simply taking a weighted average of the two vectors and would be negligibly more efficient. The reason why, in some embodiments, the system is configured to combine these vectors into broader vectors is to gain precision of vectors in the case of uncommon titles. It also makes interpretation easier.

Next, at step 225, in some embodiments, the processor may be configured to cluster one or more jobs. The processor may combine these jobs into clusters so that the system can meaningfully categorize jobs into a universal taxonomy. A goal according to some embodiments of the invention is for the system to retain flexibility. Accordingly, it may become important to create a hierarchical taxonomy to allow for broad categorizations and granular categorizations, where granular categories map to the broad ones in a many-to-one mapping. To do this, embodiments of the invention are limited to clustering algorithms in the family of agglomerative models. These models typically start with all points occupying their own cluster and then iteratively combining them until all points belong to the same cluster, in the process generating an entire tree of cluster mappings. This would be an ideal approach in some embodiments; however, there are two problems with existing implementations. The first problem is that when clusters are combined, they do not incorporate different sizes of the seed clusters, weighting small clusters and large clusters equally. The second problem is that they end up with highly non-uniform clusters, making the results poorly suited to be used as a taxonomy. Taxonomies, because of how they are used as classification systems, lose utility when there are very few groups with enormous mass and many small groups which are very sparse. To solve these two problems, in some embodiments, the processor may be configured to construct and execute a new implementation of agglomerative clustering that incorporates weights and tilts toward uniform clusters, as described herein.

In some embodiments, the processor may be configured to incorporate weights by taking weighted averages of vectors when clusters are combined. Agglomerative clustering, in its standard form, begins with each entity being an independent cluster and then iteratively combining each entity into a cluster and continuing to combine clusters. In the case of jobs/occupations, for example, there may be a desire or benefit to combining the jobs Attorney and General Counsel. In the standard implementation, the resulting cluster would take an average of the vectors from each job, even though there may be 900,000 people with the title Attorney and only 100,000 people with the title General Counsel. Instead of taking the average of these two vectors, in some embodiments, the processor may take the weighted average of these two vectors—with, e.g., 90% weight going to the vector for Attorney and 10% of the weight going to the vector for General Counsel. This means that the resulting cluster in this example represents 1 million people, most of whom have the title Attorney. Also, because the vector for Attorney is much more precisely estimated with much more data, it is likely to be the stronger vector.

Agglomerative clustering, in its standard form, also combines clusters based on distance, choosing the two clusters to combine based on the clusters that have the smallest pairwise distance. In some embodiments, Euclidean distance may be employed, although in some embodiments Manhattan distance may be more well-suited toward clustering because of its decreased sensitivity to high variance along fewer dimensions. Standard implementations do allow for customization of distance metrics. This is the optimal approach if the objective is to find inherent discontinuity in the data, which is why clustering algorithms were initially designed. But when it comes to creating clusters for the purpose of taxonomies, this approach can fall short. Taxonomies are used as ways to categorize into manageable groups. When managing groups, it is often important to have equally sized groups because management often comes with some overhead. In the case of managing a workforce, if, for example, 90% of the workforce were all in one cluster and the remaining 10% were spread out into 100 small clusters, that would not be very useful, even if it were true that the 90% were actually all very similar to each other. Uniformly sized clusters are an important objective in some embodiments, not just because it makes categorization easier but also because it makes the groups easier to manage in practice. The objective of uniformity is not necessarily something that is shared equally among everyone (some end-users may care about uniformity more than others). Some embodiments of the invention tilt toward uniform clusters by putting the sizes of clusters directly into the objective function. This way, smaller clusters are more likely to combine with others than big clusters.

Take, for example, three jobs—Physical Therapist (A), Occupational Therapist (B), and Speech Therapist (C). The distance between A and B is 5, the distance between A and C is 11 and the distance between B and C is 6, and the counts for A, B, and C are 10 million, 5 million, and 2 million, respectively. Occupational Therapists are right in between Physical Therapists and Speech Therapists and must be combined with one of them. If combining were prioritized based only on distance, A and B would be combined into one massive cluster which, while closer, would result in very non-uniform clusters. If the system penalizes prioritization based on size as well as cluster, B and C will be combined, resulting in two clusters that are similarly sized.

Rather than simply combining clusters based on distance, in some embodiments, the processor may be configured to combine clusters based on distance, the size of the larger cluster, and the size of the smaller cluster. In some embodiments, exponential weights may be placed on each of the latter components, with a larger weight on the larger cluster. This penalizes the algorithm for combining two large clusters together, with a higher penalty on the larger cluster. In some embodiments, these two parameters may be treated like hyperparameters and can be tweaked based on downstream preferences of how end-users prefer uniformity relative to similarity.

In some embodiments, at step 230, the processor may be configured to name one or more clusters. Because there may be a large number of levels of clusters, and each one may have a different combination of jobs in each cluster, embodiments of the invention name these clusters in an automated way. In some embodiments, the processor may select a job within each cluster to represent the entire cluster—this ensures that clusters are never given the same name at the same level. In some embodiments, one or more of several factors may be considered: the size of the job, the distance of the job to the cluster centroid, and/or whether the job is at the level of an entire title or a sub-title within an industry or company. For example, in some embodiments, it may be preferable for the name to be Accountant rather than Accountant—Financial Services. Accordingly, embodiments of the invention may impose hyperparameters on each of these elements so that the processor may choose or select a title which is, for example, common, close to cluster centroid, and is less likely to be a sub-title. For example, for each job within a title, there may be three factors considered—distance from centroid (X), size (Y), and a binary variable which indicates whether this title exists without an industry (Z). The score for this may be defined as $X^a Y^b Z^c$ where a, b and c, are hyperparameters that can be tuned. In some embodiments, these hyperparameters may be tuned based on active tagging of representative titles. These hyperparameters may continue to be more finely tuned, e.g., based on feedback from end-users.

In some embodiments, at step 235, the processor may be configured to classify jobs to clusters. Because of the hierarchical nature of the clusters, embodiments of the invention classify at the most granular level and include each new title in the same cluster as that target cluster aggregates up the tree. In the case of new jobs with enough of a count to generate a robust cluster, the processor may be configured to classify the new title to the closest title that does belong to a cluster, as measured directly through vector distance. This is identical to k-nearest neighbor where the "k" number of neighbors is exactly 1. In a k-nearest neighbor classifier, the predicted class is the maximum class of the k-closest observations and that is the approach executed according to some embodiments of the invention when k is 1. In the case of jobs without the counts to justify the generation of a vector, in some embodiments, the processor may use character distance, using, for example, Levenshtien distance, although there are other measures of character distance that also work, as understood by those skilled in the art.

Finally, at step 240, in some embodiments, the processor may be configured to output an occupational taxonomy, e.g., to a display, or as a data set. Through these series of steps, embodiments of the invention provide a job2vec model that classifies every job to a universal taxonomy of occupations in a flexible and automated way.

Figure 3:
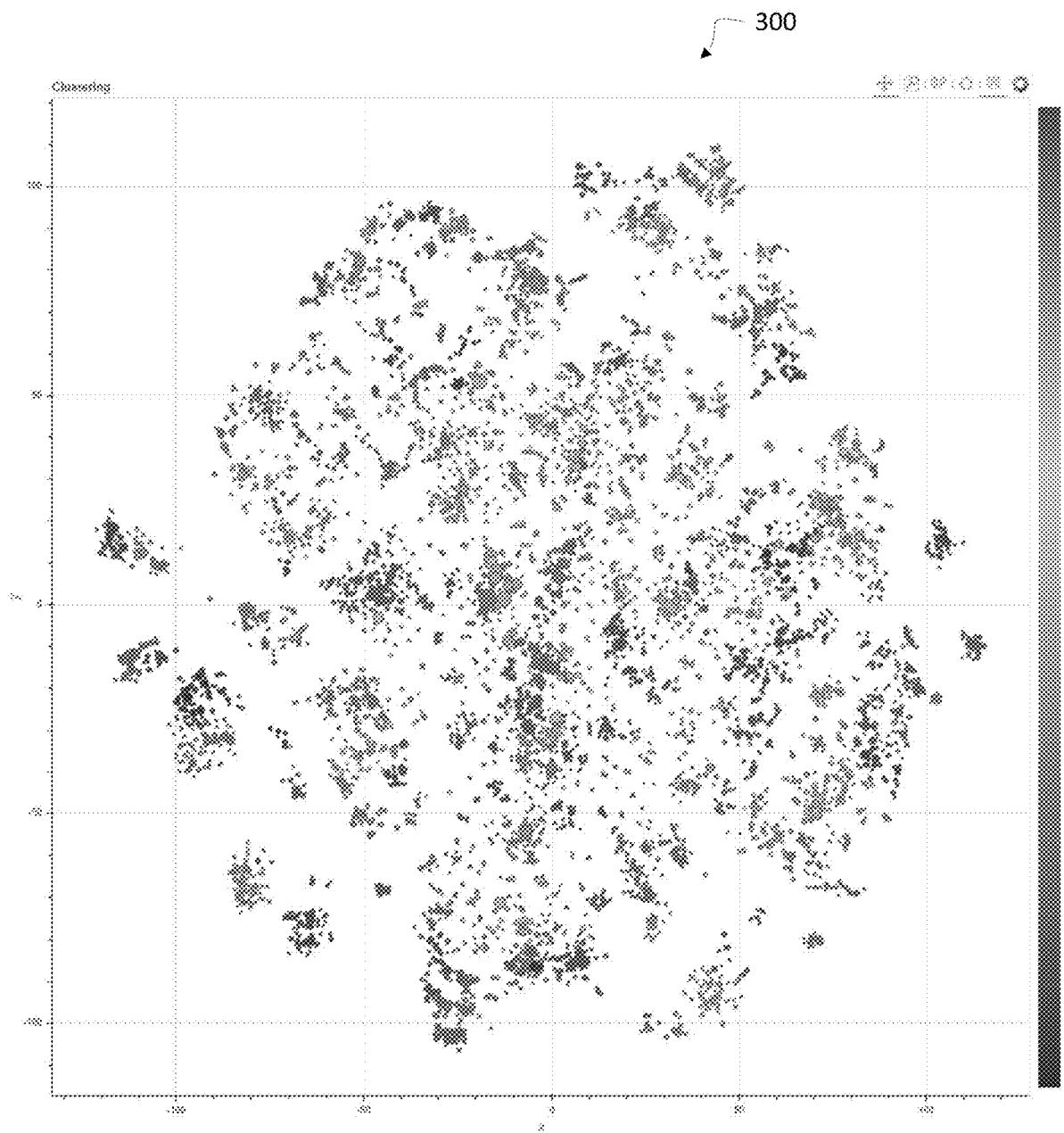
FIG. 3 shows an example output of an occupational taxonomy according to at least one embodiment of the invention.

FIG. 3 shows an example output of an occupational taxonomy 300 according to at least one embodiment of the invention.

Embodiments of the invention provide a significant real-world benefit and improvement to prior art systems and methods. For example, as explained above, prior art systems often contain inaccuracies and/or misidentified information which waste unnecessary data storage (e.g., of inaccurate information) and require significant processing power to check and correct inaccurate data. However, by creating a universal taxonomy of occupations according to embodiments of the invention, accurate data is produced, without requiring additional processing power or time to identify and review data, and without requiring additional storage. For example, by clustering jobs as described herein, additional unnecessary data storage is avoided. Similarly, by correctly naming clusters with titles that properly represent a given cluster, processing power is conserved. Embodiments of the invention likewise provide a practical application of a universal occupational taxonomy, e.g., by generating visual graphics and/or other outputs which benefit end-users who are able to then implement real-world decisions and objectives based on clearly provided and easily understood information.

Unless explicitly stated, the method embodiments described herein are not constrained to a particular order or sequence. Furthermore, all formulas described herein are intended as examples only and other or different formulas may be used. Additionally, some of the described method embodiments or elements thereof may occur or be performed at the same point in time.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

Various embodiments have been presented. Each of these embodiments may of course include features from other embodiments presented, and embodiments not specifically described may include various features described herein.

What is claimed is:

1. A method for providing a universal occupational taxonomy comprising:
    establishing, by a processor, one or more levels of granularity of a plurality of jobs, wherein establishing the one or more levels of granularity comprises:
        establishing, by the processor, a most granular level and setting a first threshold for counts for company-title pairs;
        if the first threshold is not met, establishing, by the processor, a higher level and setting a second threshold for industry-title pairs; and
        if the second threshold is not met, establishing, by the processor, one or more additional higher levels and corresponding thresholds until a threshold is met;
    assembling, by the processor, data for each job of the plurality of jobs;
    training, by the processor, one or more vector representations, based on the data, using at least one of a single-layer neural network or a multi-layer neural network,
    wherein a vector representation is trained for each job of the plurality of jobs, and
    wherein training the one or more vector representations for each job comprises:
        implementing, by the processor, the at least one of the single-layer neural network or the multi-layer neural network based on at least one of a distributed bag of words (DBOW) implementation, a skip-gram implementation, a Distributed Memory (DM) model, a Bidirectional Encoder Representations from Transformers (BERT) model, or a Universal Language Model Fine-tuning (ULMFiT) model;
    reevaluating, by the processor, the one or more levels of granularity based on the training, wherein reevaluating, by the processor, the one or more levels of granularity based on the training comprises:
        combining a first given vector representation and a second given vector representation into a single vector representation when a statistical insignificance is identified between the first given vector representation and the second given vector representation;
    clustering, by the processor, the plurality of jobs into one or more clusters based on the one or more vector representations; wherein clustering, by the processor, the plurality of jobs into one or more clusters based on the one or more vector representations comprises:
        implementing one or more agglomerative models; and
        creating a hierarchical taxonomy using the one or more agglomerative models, wherein one or more granular categories are each mapped to one broader category in a many-to-one mapping;
    naming, by the processor, the one or more resulting clusters a representative title;
        wherein naming the one or more resulting clusters the representative title comprises:

selecting, for each cluster, a title based on a distance from centroid (X), a size (Y), and a binary variable which indicates whether this title exists without an industry (Z);

classifying, by the processor, the one or more jobs to the one or more clusters; and outputting, by the processor, an occupational taxonomy.

2. The method as in claim 1, wherein assembling the data for each job comprises:

collecting, by the processor, text of descriptions of the plurality of jobs from a plurality of profiles; and concatenating, by the processor, all the collected profile data into one text document for each job.

3. The method as in claim 2, wherein training, by the processor, the one or more vector representations is based on the text document for each job.

4. The method as in claim 1, wherein outputting, by the processor, an occupational taxonomy comprises:

outputting the occupational taxonomy at least one of to a display and as a data set.

5. A system for providing a universal occupational taxonomy comprising:

a memory;

a processor; and one or more code sets stored in the memory and executing in the processor which, when executed, configured the processor to:

establish one or more levels of granularity of a plurality of jobs, wherein, the processor is configured to:

establish a most granular level and setting a first threshold for counts for company-title pairs;

if the first threshold is not met, establish a higher level and setting a second threshold for industry-title pairs; and if the second threshold is not met, establish one or more additional higher levels and corresponding thresholds until a threshold is met;

assemble data for each job of the plurality of jobs;

train one or more vector representations, based on the data, using at least one of a single-layer neural network or a multi-layer neural network, wherein a vector representation is trained for each job of the plurality of jobs, and wherein training the one or more vector representations for each job comprises:

implementing the at least one of the single-layer neural network or the multi-layer neural network based on at least one of a distributed bag of words (DBOW) implementation, a skip-gram implementation, a Distributed Memory (DM) model, a Bidirectional Encoder Representations from Transformers (BERT) model, or a Universal Language Model Fine-tuning (ULMFiT) model;

reevaluate the one or more levels of granularity based on the training, wherein, when reevaluating the one or more levels of granularity based on the training, the processor is configured to:

combine a first given vector representation and a second given vector representation into a single vector representation when a statistical insignificance is identified between the first given vector representation and the second given vector representation;

cluster the plurality of jobs into one or more clusters based on the one or more vector representations;

wherein, when clustering the plurality of jobs into one or more clusters based on the one or more vector representations, the processor is configured to:

implement one or more agglomerative models; and create a hierarchical taxonomy using the one or more agglomerative models, wherein one or more granular categories are each mapped to one broader category in a many-to-one mapping;

name the one or more resulting clusters a representative title;

wherein naming the one or more resulting clusters the representative title comprises:

selecting, for each cluster, a title based on a distance from centroid (X), a size (Y), and a binary variable which indicates whether this title exists without an industry (Z);

classify the one or more jobs to the one or more clusters; and output an occupational taxonomy.

6. The system as in claim 5, wherein, when assembling the data for each job, the processor is further configured to:

Collect text of descriptions of the plurality of jobs from a plurality of profiles; and concatenate all the collected profile data into one text document for each job.

7. The system as in claim 6, wherein, training the one or more vector representations is based on the text document for each job.

8. The system as in claim 5, wherein, when outputting the occupational taxonomy, the processor is further configured to:

output the occupational taxonomy at least one of to a display and as a data set.

9. A method for providing a universal occupational taxonomy comprising:

establishing, by a processor, one or more levels of granularity of a plurality of jobs, wherein establishing the one or more levels of granularity comprises:

establishing, by the processor, a most granular level and setting a first threshold for counts for company-title pairs;

if the first threshold is not met, establishing, by the processor, a higher level and setting a second threshold for industry-title pairs; and if the second threshold is not met, establishing, by the processor, one or more additional higher levels and corresponding thresholds until a threshold is met;

assembling, by the processor, data for each job of the plurality of jobs;

training, by the processor, one or more vector representations, based on the data, using a neural network implementing at least one of a distributed bag of words (DBOW) implementation, a skip-gram implementation, a Distributed Memory (DM) model, a Bidirectional Encoder Representations from Transformers (BERT) model, or a Universal Language Model Fine-tuning (ULMFiT) model, wherein a vector representation is trained for each job of the plurality of jobs;

reevaluating, by the processor, the one or more levels of granularity based on the training, wherein reevaluating, by the processor, the one or more levels of granularity based on the training comprises:

combining a first given vector representation and a second given vector representation into a single vector representation when a statistical insignificance is identified between the first given vector representation and the second given vector representation;

clustering, by the processor, the plurality of jobs into one or more clusters based on the one or more vector representations;

wherein clustering, by the processor, the plurality of jobs into one or more clusters based on the one or more vector representations comprises:

implementing one or more agglomerative models; and creating a hierarchical taxonomy using the one or more agglomerative models, wherein one or more granular categories are each mapped to one broader category in a many-to-one mapping;

naming, by the processor, the one or more resulting clusters a representative title;

wherein naming the one or more resulting clusters the representative title comprises:

selecting, for each cluster, a title based on a distance from centroid (X), a size (Y), and a binary variable which indicates whether this title exists without an industry (Z);

classifying, by the processor, the one or more jobs to the one or more clusters; and outputting, by the processor, an occupational taxonomy at least one of to a display and as a data set.

10. The method as in claim 9, wherein assembling the data for each job comprises:

collecting, by the processor, text of descriptions of the plurality of jobs from a plurality of profiles; and concatenating, by the processor, all the collected profile data into one text document for each job.

11. The method as in claim 10, wherein training, by the processor, the one or more vector representations is based on the text document for each job.

12. The method as in claim 9, wherein outputting, by the processor, an occupational taxonomy comprises:

outputting the occupational taxonomy at least one of to a display and as a data set.

\* \* \* \* \*